(12) United States Patent
Weidenhaupt et al.

(10) Patent No.: US 6,319,993 B2
(45) Date of Patent: Nov. 20, 2001

(54) VULCANIZING AGENTS FOR UNSATURATED RUBBER MIXTURES

(75) Inventors: Hermann-Josef Weidenhaupt, Pulheim; Hartmuth Buding, Titz; Josef Hahn, Köln; Marco Runk, Brühl, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/766,553

(22) Filed: Jan. 19, 2001

(30) Foreign Application Priority Data

Jan. 24, 2000 (DE) .............................................. 100 02 878

(51) Int. Cl.$^7$ .............................. C08C 19/00; C08G 75/14
(52) U.S. Cl. .................................. 525/332.6; 525/332.5; 528/389
(58) Field of Search .............................. 525/332.6, 332.5; 568/21, 389

(56) References Cited

U.S. PATENT DOCUMENTS

| | | | |
|---|---|---|---|
| 2,989,513 | 6/1961 | Hendry et al. ........................ 260/79 |
| 3,259,598 | 7/1966 | Solomon ................................ 260/23 |
| 3,264,239 | 8/1966 | Rosen et al. ........................ 260/23.7 |
| 3,354,131 | * 11/1967 | Trivette et al. . |
| 3,373,146 | * 3/1968 | Meyer et al. . |
| 3,438,951 | * 4/1969 | Van De Castle et al. . |
| 3,466,179 | * 9/1969 | Greco . |
| 3,523,926 | 8/1970 | Mirviss .................................. 260/79 |
| 3,544,492 | 12/1970 | Taylor et al. ............................ 260/4 |
| 4,190,460 | * 2/1980 | Cassar . |
| 4,739,036 | * 4/1988 | Colvin et al. .......................... 528/389 |
| 4,792,589 | 12/1988 | Colvin et al. .......................... 525/343 |
| 4,902,775 | 2/1990 | Colvin et al. .......................... 528/389 |
| 5,342,900 | 8/1994 | Wolpers et al. ...................... 525/329.3 |
| 5,684,091 | * 11/1997 | Maly et al. . |
| 5,872,188 | * 2/1999 | Datta et al. ............................ 525/150 |

FOREIGN PATENT DOCUMENTS

| | | |
|---|---|---|
| 94/12450 | 6/1994 | (WO) . |
| 99/48966 | 9/1999 | (WO) . |

OTHER PUBLICATIONS

Rubber Chemistry & Technology, vol. 68, Issue 5, Nov.–Dec., 1995, pp. 746–756, Colvin et al, "Sulfur/Olefin Copolymers As Vulcanizing Agents for Rubber".

Gummi, Fsern Kunststoffe, 8, (month unavailable), 1997, pp. 627–634, Colvin et al, "Schwefel/Olefin–Copolymere Als Vulkanisationmittel für Kautschuk".

Rubber World, Aug. 1997, pp. 24–27, Datta et al, "Optimizing Tire Compound Reversion Resistance Without Sacrificing Performance Characteristics".

F. Feher in G. Bauer, Handbuch der Praparativen Anoganischen Chemie, vol. 1, 3rd Ed., 1975–1981, Enke Verlag, Stuttgart, pp. 362–364, and pp. 368–369, Rohsulfan $H_2S_x$.

Kautschuk–Technologie, Genter Verlag Stuttgart, (month unavailable), 1980, p. 64 and 254–255, Hofmann, "Vulkanisationschemikalien" and "Schwefel".

\* cited by examiner

*Primary Examiner*—Jean F. Vollano
(74) *Attorney, Agent, or Firm*—Joseph C. Gil; Noland J. Cheung

(57) ABSTRACT

The invention relates to polymeric sulfur compounds, their preparation and their use as vulcanizing agents for unsaturated rubber mixtures.

10 Claims, No Drawings

VULCANIZING AGENTS FOR UNSATURATED RUBBER MIXTURES

FIELD OF THE INVENTION

The invention relates to new polymeric sulfur compounds, their preparation and their use as vulcanizing agents for unsaturated rubber mixtures.

BACKGROUND OF THE INVENTION

The most common vulcanizing agents widely used for unsaturated rubbers, such as, e.g., natural rubber (NR), isoprene rubber (IR), butadiene rubber (BR) and styrene/butadiene rubber (SBR) is sulfur in elemental form. For the production of rubber, approx. 0.25 to 5.0 parts by wt. sulfur, based on 100 parts by wt. rubber, are used. The amount of sulfur, which is effectively used, depends on the amount of vulcanization accelerator chosen, which in the end is determined be the desired properties of the vulcanization products.

Vulcanizing systems which are very often used are the conventional and the semi-efficient vulcanizing system. The conventional vulcanizing system has a high sulfur content and low vulcanization accelerator content, while the semi-efficient vulcanizing system has a moderate dosage of sulfur and vulcanizates accelerator. The typical dosages are known to the expert. They are described e.g. in W. Hofmann, Kautschuk-Technologie, Genter Verlag, Stuttgart, 1980 p. 64 and 254–255. Conventional vulcanizing systems result in vulcanizates with good resistance to dynamic stresses (flex life), but these are very sensitive to aging and reversion. Semi-efficient vulcanizing systems usually give vulcanizates which have a less of a resistance to dynamic stresses (flex life), but, in return, they are somewhat more stable to aging and reversion (cf. R. N. Datta and W. F. Helt, Rubber World, August 1997, p. 24, et seq.)

Reversion is understood as meaning a rearrangement of network bridges which takes place under the action of heat in the absence of oxygen and leads to a deterioration in the use properties of the vulcanizate and is thus, undesirable (anaerobic aging). Reversion is unavoidable during the vulcanization of very thick and voluminous components, e.g. in truck and buis tires and fenders. The physical explanation of this is simple: when the inner volumes of rubber mixture are just correctly vulcanized by the heat flow introduced via the hot vulcanization mould, the rubber mixture volumes directly adjacent to the hot vulcanization mold are, of course, already over-vulcanized On the other hand, during use of these rubber components under long lasting, intensive dynamic stress, an increase in temperature (heat build-up) of the rubber component takes place due to hysteresis (cf. flexing, of the tire), which causes reversion of the vulcanizates. Reversion can take place to such an extent that it even leads to destruction and therefore, unusability of the vulcanizate.

Some reversion stabilizer speciality products have been disclosed in recent years which either minimize reversion by incorporation of heat-stable network bridges which are practically incapable of reversion (cf. EP-A 530 590), or which replace the broken conventional network crosslinks after reversion has already taken place by other more stable crosslinks (cf. R. N. Datta and W. F. Helt, Rubber World, August 1997, p. 24 et seq.).

Commercially available reversion stabilizer speciality products are the disodium salt of hexamethylene-1,6-dithiosulfate dihydrate and 1,3-bis(citraconimidomethyl)-benzene.

A general disadvantage of these commercial reversion stabilizer speciality products is their relatively high price, which is caused by educts which are not available in large amounts and by the difficult and expensive preparation of these products, as a result of which widespread use is prevented in the rubber-processing industry, which is under constant pressure to reduce costs, in particular in the tire industry. A specific disadvantage of disodium hexamethylene-1,6-dithiosulfite dihydrate is its expensive delivery form. Because of its salt character, it must be ground very finely in view of good mixing-in properties, which on the other hand from the industrial hygiene aspect again involves oiling the powder to suppress dust.

A specific disadvantage of 1,3-bis(citraconimidomethyl)-benzene is that it can become active in the vulcanizate solely and only if reversion has already started in the unsaturated rubber crosslinked with sulfur and conjugated olefins have thus formed, which in turn can react in a post-crosslinking with the citraconic derivatives (via Diels-Alder reaction) to give a new but now different network.

A disadvantage of the vulcanizing agents of EP-A 530 590 which have been described is their high molecular weight, compared with the species actually having the crosslinking action.

A large number of reaction products of olefins and sulfur have been disclosed in the past: EP-A 258 168 thus discloses the reaction of olefins with sulfur in water, it being possible for bases to be present as catalysts. Styrene, alpha-methylstyrene, cyclopentadiene and dicyclopentadiene are mentioned as preferred olefins (page 4, lines 14 and 15). Cyclopentadiene de facto does not occur in the embodiment examples according to EP-A 258 168. On page 7, lines 57–58 and page 8, lines 1–3, on the subject of industrial applicability it is disclosed that the crosslinking agents according to EP-A 258 168 lead to vulcanizates which are comparable in their physical properties to the properties obtained with a conventional sulfur crosslinking system. An improved stability of the vulcanizates according to EP-A 258 168 to reversion has not been disclosed and is also not described. Our own experiments (cf. Example 1) have shown that the products according to EP-A 258 168 of dicyclopentadiene and sulfur give vulcanizates which do not reveal an improved resistance to reversion. The particular advantage of the crosslinking agents according to EP-A 258 168, however, lies in the fact that, compared with sulfur, they do not bloom or bloom less. The structures of the vulcanizing agents according to EP-A 258 168 are described (cf. H. Colvin and Ch. Bull, Gummi, Fasern, Kunststoffe 8 (1997) 627–634 and Rubber Chemistry & Technology vol. 68 issue 5, November–December 1995, p. 746–756). They are polymers of sulfur and polycyclic hydrocarbons. These compounds are completely different in terms of structure from the compounds of the present invention.

On the basis of EP-A 258 168, products of olefins and sulfur with particular particle diameters are described in WO-A 99/48966.

U.S. Pat. No. 3,259,598 describes the use of a product of sulfur, linseed oil and styrene as vulcanizing agents for rubber. U.S. Pat. No. 3,264,239, furthermore, discloses a vulcanizing agent of sulfur, linseed oil and dicyclopentadiene.

U.S. Pat. No. 3,523,926 discloses vulcanizing agents from diolefins, such as, e.g., cyclopentadiene and dicyclopentadiene, and sulfur with amines as a catalyst. At no point in this publication is the additional use of hydrogen sulfide described nor suggested.

U.S. Pat. No. 2,989,513 discloses polymers of sulfur and an olefin for the vulcanization of rubber. As useful olefins there are mentioned cyclopentene, inter alia, from the series of cycloalkenes in column 3, line 19, and cyclopenitadiene, inter alia, from the series of polyolefins in column 3, line 21. The reaction according to U.S. Pat. No. 2,989,513 is preferably carried out between 145° and 160° C. The embodiment examples include only copolymers of sulfur and styrene or of sulfur and ethylene or of sulfur and isobutylene. At no point in this publication is the additional use of hydrogen sulfide described nor suggested.

WO-A 94/12450 discloses a method for the preparation of sulfur-containing compounds from e.g. alkenes, such as e.g. hexadec-1-ene, dec-1-ene and octa-1,7-diene, and compounds of the formula $MHS_x$, wherein M denotes a cation, such as e.g. $Na^+$, $K^+$ or $NH_4^+$. The compounds of the formula $MHS_x$ can be employed as vulcanizing agents for rubber, a solvent being employed.

It is also known to react cyclopentadiene with sulfanes to give di-cyclopentenylpolysulfanes.

The vulcanizates, which are conventionally widely produced from unsaturated rubbers are produced only with sulfur and an accelerator as the vulcanizing agent, i.e. that is to say without agents which prevent or reduce reversion. The properties of rubber vulcanizates produced conventionally with conventional and semi-efficient vulcanizing systems are in need of improvement. There is therefore a need for a vulcanizing agent for unsaturated rubbers which is predominantly based on synthesis units which are available in large amounts, is readily accessible and can therefore be prepared economically, and which can completely or partly replace the crystalline sulfur, which tends to bloom, in a vulcanizing system and leads to vulcanizates with an improved reversion stability and a lower beat build-up, in particular after over-curing.

SUMMARY OF THE INVENTION

This object has surprisingly been achieved by vulcanization of an unsaturated rubber compound with specific new polymeric sulfur compounds.

The invention therefore provides new polymeric sulfur compounds of the formula (I)

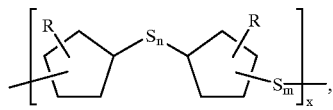

wherein the substituents

R represent hydrogen and/or methyl, n and m denote integral or non-integral numbers in the range from 2 to 12 and x denotes an integral or non-integral number in the range from 2 to 500.

The invention also provides the preparation of the new polymeric sulfur compounds of the formula (I) and their use as vulcanizing agents for unsaturated rubbers.

DETAILED DESCRIPTION OF THE INVENTION

The invention provides new polymeric sulfur compounds of the formula (I)

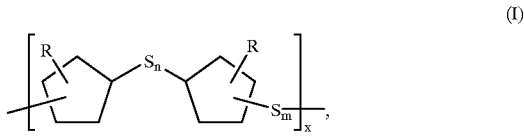

wherein the substituents

R represent hydrogen and/or methyl, n and m denote integral or non-integral numbers in the range from 2 to 12, preferably 2 to 7, and x denotes an integral or non-integral number in the range from 2 to 500.

The new polymeric sulfur compounds of the formula (I) according to the present invention are obtained by reaction of the di-cyclopentenylpolysulfanes, which are known per se, of the formulae (II), (III) and/or (IV)

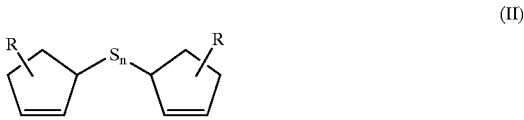

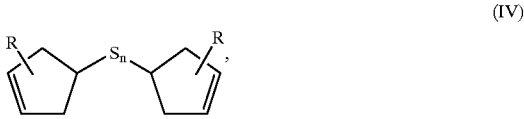

wherein

R and n have the meaning given in formula (I), with sulfur and hydrogen sulfide in the presence of amines at temperatures in the range from approx. 100° to 180° C., preferably at 130° to 150° C.

The reaction time is usually approx. 0.5 to 10 h, preferably 3 to 6 h.

In the preparation according to the present invention of the polymeric sulfur compounds, the molar ratio of di-cyclopentenyl-polysulfanes of the formulae (II), (III) and/or (IV) to sulfur is 1:1 to 1:9, preferably 1:3 to 1:5, and that of di-cyclopentenyl-polysulfanes of the formulae (II), (III) and/or (IV) to hydrogen sulfide is 2:1 to 1:5, preferably 1:1 to 1:2.

Possible catalyzing amines in the preparation of the new polymeric sulfur compounds of the formula (I) according to the present invention from the known di-cyclopentenylpolysulfanes of the formulae (II), (III) and/or (IV) are primary, secondary and tertiary aliphatic, cycloaliphatic, aromatic or heterocyclic amines or mixtures thereof. Secondary and tertiary aliphatic amines with $C_1$- to $C_4$-alkyl groups are preferred. Triethylamine is preferred. The amines are employed in an amount of approx. 0.001 to 10 parts by wt., preferably 0.1 to 1.0 part by wt., based on the di-cyclopentenylpolysulfanes of the formulae (II), (III) and/or (IV).

The new polymeric sulfur compounds of the formula (I) according to the present invention have a glass transition temperature $T_g$ (mid-point) measured by means of DSC in the range from −70° to +40° C., preferably in the range from −40° to +30° C.

The variables n and m of the polymeric sulfur compounds of the formula (I) according to the present invention are typical mean values of a sulfur chain length distribution. The variable x typically represents the average degree of polymerization.

The new polymeric sulfur compounds of the formula (I) according to the present invention are usually soluble in chloroform or in a mixture of chloroform and carbon disulfide, but the solubility in these solvents decreases gradually with increasing molecular weight of the polymeric sulfur compounds.

The preparation of di-cyclopentenylpolysulfanes of the formulae (II), (III) and/or (IV) according to the present invention can be carried out in various ways and is not limited to a specific process.

For example, the di-cyclopentenylpolysulfanes of the formulae (II), (III) and/or (IV) can be prepared from cyclopentadiene and/or methylcyclopentadiene and sulfanes in a molar ratio of 2:1 to 10:1 in solvents, such as e.g. benzene, toluene or carbon disulfide or also mixtures thereof, at −20° to 25° C., preferably at −10° to 0° C. The reaction is preferably carried out with cyclopentadiene and sulfanes without solvent. The sulfanes can be initially introduced into the reaction vessel and the cyclopentadienes according to the present invention can then be added. Preferably, the sulfanes are added to the cyclopentadienes according to the present invention. The reaction time is approx. 0.5 to 6 h, preferably 1 to 2 h. Excess cyclopentadienes and any solvents employed are removed in vacuo.

The sulfanes which are suitable for the present invention have the general formula $H_2S_z$, wherein z denotes 2 to 12, preferably 2 to 7. The variable z can be an integral discrete number, but typically represents the number-average of a sulfur chain length distribution, and can also be non-integral. The preparation of the sulfanes is not limited and these can easily be prepared e.g. from sodium polysulfide and hydrochloric acid or from hydrogen sulfide and disulfide dichloride (in this context cf. F. Fehér in G. Bauer, Handbuch der Präparativen Anorganischen Chemie, vol. 1, 3rd ed., 1975–1981, Enke Verlag, Stuttgart, pages 362–364 and 368–369).

Another possibility for the preparation of the di-cyclopentenyl-olysulfanes of the formulae (II), (III) and/or (IV) according to the present invention comprises reaction of the cyclopentadienes according to the present invention with hydrogen sulfide to give (methyl)cyclopent-2-ene-1-thiol and subsequent reaction with elemental sulfur. In this procedure, the (methyl)cyclo-entadiene is initially introduced into an auto-clave together with liquid hydrogen sulfide in a molar ratio of approx. 1:2 to 1:200, preferably 1:20 to 1:50, at a temperature of −20° to 50° C., preferably 0° to 25° C., and suitable catalysts are then added. Possible suitable catalysts are: Brönsted acids and/or Lewis acids, such as, e.g., phosphoric acid, perchloric acid, trifluoromethane-sulfonic acid, boron trifluoride etherate and anhydrous aluminum chloride. In the case of Brönsted acids, mixtures can also be employed. A preferred mixture comprises phosphoric acid and perchloric acid in a weight ratio of 1:2 to 2:1. The catalysts are employed in amounts of approx. 0.01 to 50 parts by wt, preferably 1.0 to 10 parts by wt., based on the (methyl)cyclopentadiene. Alternatively, the (methyl)cyclopentadiene can also be added to a mixture of liquid hydrogen sulfide and the catalysts. However, the addition of the catalysts to the mixture of (methyl) cyclopentadiene and hydrogen sulfide is preferred.

After a reaction time of about 0.5 to 8 h, preferably 2 to 4 h, the excess hydrogen sulfide is removed and the resulting thiol is optionally purified, e.g., by distillation, and is then reacted with sulfur in a molar ratio of 2:1 to 1:5, preferably 1:1.5 to 1:2.5, at a temperature of 0° to 80° C., preferably 20° C. to 40° C., with amines as a catalyst. Possible amines are primary, secondary and tertiary amines. Secondary and tertiary aliphatic amines with $C_1$- to $C_4$-alkyl radicals are preferably employed. Triethylamine is particularly preferred. The amines are employed in amounts of 0.001 to 10 parts by wt., preferably 0.1 to 1.0 part by wt., based on the thiol.

The new polymeric sulfur compounds of the formula (I) according to the present invention can be employed, e.g., as vulcanizing agents for unsaturated rubber compounds for the production of shaped rubber articles, such as, e.g., hoses, seals, engine mounts and fenders, but, in particular, for the production of tire components, such as, e.g., treads, apeces, sidewall strips and chafer strips, shoulder cushions, belt strips, tread slab bases and side walls.

The rubber mixtures according to the present invention are prepared in a manner known per se by conventional mixing of the unsaturated rubber components with the known additives and additional compounding ingredients, such as carbon black, silica, plasticizer, antidegradants, zinc oxide, stearic acid, resin and processing aids and the vulcanizing system comprising the new polymeric sulfur compounds according to the present invention and optionally additionally elemental sulfur.

The new polymeric sulfur compounds of the formula (I) according to the present invention can be employed either in the preparation of the base mixture with careful exclusion of a premature vulcanization, or, preferably, during preparation of the final mixing stage, together with the vulcanization accelerators and the sulfur, if desired.

Unsaturated rubbers in the context of the present invention are e.g natural rubber (NR), isoprene rubber (IR), butadiene rubber (BR) and styrene/butadiene rubber (SBR), which can be prepared by the emulsion process and also by the solution process, nitrile rubber (NBR), partly hydrogenated nitrile rubber (H-NBR) and ethylene/propylene/diene rubber (EPDM). Equally good results are also obtained with blends of these rubbers.

The use of carbon blacks is not subject to any limitation. The carbon blacks typically used in the rubber-processing industry, such as, e.g., active and semi-active carbon blacks, are preferably employed.

The use of silicas is likewise not subject to limitation. Highly dispersed silicas prepared by precipitation of solutions of silicates or by flame hydrolysis of silicon halides are preferred. The preferred silicas have a specific surface area of 20 to 400 $m^2/g$ (BET surface area) and a primary particle size of 10 to 400 nm.

The new polymeric sulfur compounds of the formula (I) according to the present invention are employed in amounts of 0.2 to 10 parts by wt., preferably in amounts of 0.5 to 6.0 parts by wt., based on 100 parts by wt. of rubber. If sulfur is additionally to be employed, the sulfur conventionally used in the rubber-processing industry or also insoluble sulfur is suitable. The preferred amount of sulfur is 0.05 to 1.5 parts by wt,, preferably 0.1 to 1.2 parts by wt., based on 100 parts by wt. of rubber.

Instead of the sulfur, it is of course also possible to employ the known sulfur donors, for example caprolactam disulfide, and also mixtures with sulfur. The amount of sulfur donor most favorable for the intended use can be easily determined by preliminary experiments.

As vulcanization accelerators, the most diverse types can be employed, and these are not subject to a limitation. Mercapto-benzothiazole (MBT), dibenzothiazyl disulfide (MBTS) and sulfenamides based on MBT, such as e.g.

benzothiazyl-2-cyclohexylsulfenamide (CBS), benzothiazyl-2-dicyclohexylsulfenamide (DCBS), benzothiazyl-2-tert-butylsulfenamide (TBBS) and benzothiazyl-2-sulfenemorpholide (MBS), are preferably employed. The vulcanization accelerators are employed in amounts of 0.5 to 3.0 parts by wt., preferably in amounts of 0.5 to 2.5 parts by wt., based on 100 parts by wt. of rubber employed. However, mixtures of vulcanization accelerators can also be employed, it being possible for the optimum composition of these in respect of type and amount to be determined easily by experiments.

The vulcanization of the rubber mixtures according to the present invention is carried out in a known manner at temperatures of approx. 120° to 220° C., preferably 140° to 180° C.

The invention is further illustrated but is not intended to be limited by the following examples in which all parts and percentages are by weight unless otherwise specified.

EXAMPLES

Example 1

Comparison Example According to Example 10 of EP-A 258 168

110.4 g (3.44 mol) sulfur flowers, 19.5 g (0.15 mol) dicyclopentadiene, 5.2 g calcium carbonate powder and 658.3 g dispersing solution comprising 8.3 g carboxymethylcellulose and 650 g completely desalinated water were initially introduced into a 1.3 l autoclave. The autoclave was flushed 3 times with nitrogen under 5 bar. The contents of the reactor were then heated up to 150° C., while stirring. After a reaction time of 3 h at 150° C., the reactor was cooled, the pressure released and flushed with nitrogen. The reaction mixture was removed. The solid was filtered off, washed with completely desalinated water and dried. According to analysis by HPLC, the product contained 4.7 parts by wt. of free sulfur.

A rubber base mixture was then prepared in accordance with the instructions of the following Example 6 and the test recipe described in Table 3, and 1.4 phr accelerator CBS and 6 phr of the substance synthesized here, without further addition of sulfur, were mixed into this mixture with a mill. The rheometer test (cf. explanations of the rubber technology tests) at 160° C./60 min gave a torque S' max of 23.4 dNm and a reversion of 51%. The corresponding rubber comparison mixture which comprised only 1.4 phr accelerator CZ and 4.0 phr sulfur as the crosslinking system gave a comparable torque in the rheometer test at 160° C., namely S' max=23.2 dNm. However, the reversion determined after 1 h was only 38%.

Evaluation: The crosslinking agent according to Example 10 of EP-A 258 168 does not give a vulcanization product with improved reversion properties compared with traditional vulcanizing agents.

Example 2

Preparation of Sulfanes from Hydrogen Sulfide and Disulfur Dichloride

All glass equipment which comes into contact with sulfanes was degreased thoroughly and boiled up in concentrated hydrochloric acid for 1 h.

470 g (14 mol) hydrogen sulfide dried over phosphorus pentoxide were condensed into a suitable vessel at −78C. Hydrogen chloride gas dried over phosphorus pentoxide was then passed into saturation. 250 g (1.5 mol) disulfur dichloride were added dropwise from a dropping funnel equipped with a Teflon tap over half an hour, with vigorous stirring while maintaining the cooling. The mixture was subsequently stirred for 1 h and excess hydrogen sulfide was then evaporated off. The mixture was warmed slowly to room temperature for complete removal of the hydrogen sulfide in vacuo (1 mbar).

$^1$H-NMR ($C_6D_6$): average sulfur chain length z=5.7

Example 3

Preparation of Di-cyclopentenylpolysulfanes of the Formulae (II), (III) and (IV) where R=H The same as described for the preparation of the sulfanes in Example 2 applied to the pretreatment of the glass equipment.

33.6 g (0.182 mol) of the sulfane described in Example 2 were dissolved in 30 ml carbon disulfide in a 250 ml round-bottomed glass with a magnetic stirrer and the solution was cooled to 0° C., while stirring. 26.6 g (0.403 mol) of freshly purified cyclopentadiene were then added dropwise to the dissolved sulfane at 0° C. in the course of 50 min, while stirring. The mixture was subsequently stirred at 0° C. for 3 h and then warmed Up slowly to room temperature. The yellow solution was freed from carbon disulfide and excess cyclopentadiene by recondensation under 20 mbar. A yellow oily liquid remained.

$C_{10}H_{14}S_{5.6}$ (MW: 313.76)

| | | |
|---|---|---|
| C calc.: 38.28% | H calc.: 4.50% | S calc.: 57.22% |
| C found: 38.6/38.5% | H found: 4.6/4.6% | S found: 57.7/57.7% |
| IR (film): | ν = 3059 1/cm (m) | |
| | ν = 1605 1/cm (w) | |
| | ν = 737 1/cm (s) | |
| MS: | (EI, 20 eV, 65° C., direct inlet) | |
| | M$^+$ (n = 2): 198 | |
| | M$^+$ (n = 3): 230 | |
| | M$^+$ (n = 4): 262 | |
| | M$^+$ (n = 5): 294 | |
| | M$^+$ (n = 6): 326 | |

Example 4

Preparation of the Polymeric Sulfur Compounds of the Formula (I) According to the Present Invention A 1 l stirred autoclave rendered inert with nitrogen was charged in succession with 57.57 g (1.796 mol) sulfur, 190 g (0.599 mol) of the di-cyclopentenylpolysulfanes prepared in Example 3, 1.14 g triethylamine and 28.5 g (0.836 mol) hydrogen sulfide. The mixture was heated up to 140° C., while stirring. After a reaction time of 5 h, the autoclave was cooled, the pressure released and flushed with nitrogen. A viscous oil which was completely soluble in chloroform or chloroform/carbon disulfide (10:1) was obtained as the reaction product.

$C_{10}H_{16}S_{9.5}$ (MW: 440.81 k)

| | | |
|---|---|---|
| C calc.: 27.25% | H calc.: 3.66% | S calc.: 69.09% |
| C found: 27.2/27.3% | H found: 3.6/3.6% | S found: 68.6/69.4% |
| IR (film): | ν = 1438 1/cm (s) | |
| | ν = 1314 1/cm (m) | |
| | ν = 1234 1/cm (m) | |

DSC: Glass transition temperature $T_g$=−14.1° C. midpoint (heating-up rate: 5° C./min)

GPC: Solvent: chloroform/carbon disulfide (10:1)

x = 2 to 41 (column: Jordi Gel DVB, 500 Å, 500 × 10 mm, eluent: chloroform with 0.5 part by wt. ethanol, UV detection: 260 nm, retention time: 11 to 23 min)

NMR: $^1$H- and $^{13}$C-NMR (CDCl$_3$/CS$_2$=10:1)

TABLE 1

The typical ranges of the chemical shift (ppm) for 1,2-substitution are:

1,2-substituted

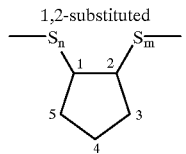

| Atom no. | δ ($^1$H) | δ ($^{13}$C) |
|---|---|---|
| 1, 2 | 3.5–4.1 | 54.2–58.2 |
| 3, 5 | 1.9–2.4 | 30.0–34.1 |
| 4 | 1.5–1.9 | 21.7–24.4 |

TABLE 2

The typical ranges of the chemical shift (ppm) for 1,3-substitution are:

1,3-substituted

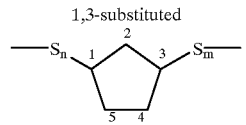

| Atom no. | δ ($^1$H) | δ ($^{13}$C) |
|---|---|---|
| 1.3 | 3.6–3.9 | 48.0–50.9 |
| 2 | 2.2–2.4 | 37.7–41.9 |
| 4, 5 | 1.8–2.4 | 30.0–34.1 |

Explanations of the Rubber Technology Tests

The following test methods and test devices were used: Rheometer: ASTM D 2084, Monsanto MDR 2000E. Tensile test: DIN 53405, dump-bell. Hardness: DIN 53505. Rebound resilience: DIN 53512. Tear propagation resistance: DIN 53504. Viscoelastic properties: DIN 53513/ISO 4664, Roelig test 10 Hz. Dynamic properties: DIN 53533, Goodrich flexometer, 100° C./25 min, pre-strain 1 MPa, stroke 4.45 mm.

Example 5

Test mixtures according to Table 3 were prepared with the aid of an internal mixer of the type GK 1.5E from Werner & Pfleiderer at a rotor speed of 40 rpm and a chamber and blade temperature of 50° C. (ram pressure 8 bar, filling level 65%).

The accelerator, sulfur and the new polymeric sulfur compounds according to the invention were admixed on a mill. The amount stated are parts by wt. per 100 parts by wt. of rubber.

TABLE 3

Test recipe

| Mixture Number | Comparison 1 | Invention 2 | Invention 3 |
|---|---|---|---|
| NR (TSR 5, Defo 1000) | 100 | 100 | 100 |
| Zinc oxide RS | 5 | 5 | 5 |
| Stearic acid | 3 | 3 | 3 |
| Carbon black N330 | 45 | 45 | 45 |
| 6PPD | 2 | 2 | 2 |
| Arom. plasticizer | 5 | 5 | 5 |
| Sulfur | 1.35 | 0 | 0.3 |
| CBS | 1.4 | 1.4 | 1.4 |
| Polymeric sulfur compound according to example 4 (invention) | 0 | 4 | 3 |

TABLE 4

Rheometer data

| Mixture number | Comparison 1 | Invention 2 | Invention 3 |
|---|---|---|---|
| 150° C./60 min | | | |
| t01 (min) | 3.2 | 2.7 | 2.7 |
| t90 (min) | 6.9 | 8.9 | 7.6 |
| S' max (dNm) | 13.9 | 14.2 | 14.1 |
| S' end (dNm) | 12.3 | 13.8 | 13.7 |
| Reversion (%) | 11.5 | 2.8 | 2.8 |
| 160° C./60 min | | | |
| t01 (min) | 1.8 | 1.6 | 1.5 |
| t90 (min) | 3.5 | 4.4 | 3.9 |
| S'max (dNm) | 12.9 | 13.1 | 13.0 |
| S'end (dNm) | 9.8 | 11.1 | 10.9 |
| Reversion (%) | 24.0 | 15.3 | 16.2 |

The reversion in % was determined as follows from the rheometer data: (S'max−S'end)×1/S'max×100 (%)

It can be seen from Table 4 that the mixtures according to the present invention have a significantly higher reversion resistance (the lower the reversion value, the higher the reversion resistance) than Companison mixture 1. It can, furthermore, be seen that the mixtures according to the present invention show a practically comparable processing safety (measured by the t01 time) to Comparison mixture 1.

TABLE 5

Properties of the test vulcanizates products after optimum cure

| Mixture Number | Comparison 1 | Invention 2 | Invention 3 |
|---|---|---|---|
| Vulcanization: 150° C. | | | |
| Tensile strength (MPa) | 27 | 28 | 28 |
| Elongation at break (%) | 570 | 590 | 590 |
| Modulus 100 (MPa) | 2.1 | 2.1 | 2.2 |
| Modulus 300 (MPa) | 10.1 | 9.6 | 9.7 |
| Tear resistance (N) | 78 | 69 | 63 |
| Hardness at 23° C. (Shore A) | 62 | 63 | 64 |
| Elasticity at 23° C. (%) | 46 | 45 | 45 |
| Roelig 0° C. | | | |
| tan delta | 0.232 | 0.242 | 0.234 |
| E' (MPa) | 9.108 | 9.879 | 9.632 |
| E" (MPa) | 2.114 | 2.385 | 2.254 |
| Roelig 60° C. | | | |
| tan delta | 0.142 | 0.150 | 0.143 |

TABLE 5-continued

Properties of the test vulcanizates products after optimum cure

| Mixture Number | Comparison 1 | Invention 2 | Invention 3 |
|---|---|---|---|
| E' (MPa) | 5.180 | 5.579 | 5.578 |
| E" (MPa) | 0.736 | 0.837 | 0.798 |
| Goodrich flexometer | | | |
| Flow (%) | 5 | 11 | 8 |
| Internal temperature (° C.) | 138 | 136 | 133 |

It can be seen from Table 5 that the vulcanizates according to the present invention have a lower internal temperature than the comparison vulcanizate under exposure to dynamic stress (Goodrich flexometer test).

TABLE 6

Properties of the test vulcanizates after overcure

| Mixture Number | Comparison 1 | Invention 2 | Invention 3 |
|---|---|---|---|
| Vulcanization: 150° C./60 min. | | | |
| Tensile strength (MPa) | 23 | 23 | 25 |
| Elongation at break (%) | 590 | 580 | 570 |
| Modulus 100 (MPa) | 1.5 | 1.9 | 1.9 |
| Modulus 300 (MPa) | 7.3 | 8.3 | 9.0 |
| Tear resistance (N) | 53 | 50 | 50 |
| Hardness at 23° C. (Shore A) | 60 | 60 | 61 |
| Elasticity at 23° C. (%) | 44 | 38 | 42 |
| Roelig 0° C. | | | |
| tan delta | 0.248 | 0.258 | 0.242 |
| E' (MPa) | 9.913 | 11.659 | 11.243 |
| E" (MPa) | 2.464 | 3.007 | 2.722 |
| Roelig 60° C. | | | |
| tan delta | 0.178 | 0.175 | 0.158 |
| E' (MPa) | 4.981 | 5.648 | 5.767 |
| E" (MPa) | 0.855 | 0.986 | 0.913 |
| Goodrich flexometer | | | |
| Flow (%) | 4 | 7 | 6 |
| Internal temperature (° C.) | 148 | 144 | 143 |

It can be seen from Table 6 that after overcuring, the vulcanizates according to the invention havoc a lower internal temperature and a more favorable retention of the modulus than the comparison vulcanizate under exposure to dynamic stress (Goodrich flexometer test).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymeric sulfur compound of the formula (I)

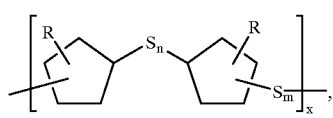

(I)

wherein the substituents
R represent hydrogen and/or methyl,
n and m independently denote integral or non-integral numbers in the range from 2 to 12 and
x denotes an integral or non-integral number in the range from 2 to 500.

2. A process for the preparation of a polymeric sulfur compound comprising the structure

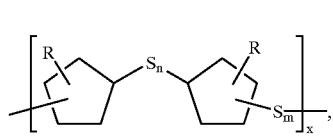

(I)

wherein the substituents
R represent hydrogen and/or methyl,
n and m independently denote integral or non-integral numbers in the range from 2 to 12 and
x denotes an integral or non-integral number in the range from 2 to 500;
wherein said polymeric sulfur compound is produced by reacting di-cyclopentenyl-polysulfanes of the formulae (II), (III) and/or (IV)

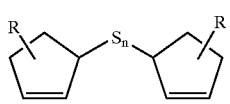

(II)

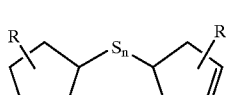

(III)

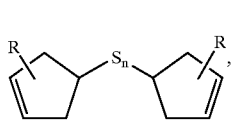

(IV)

with sulfur and hydrogen sulfide in the presence of amines at temperatures of 100 to 180°C.

3. A process according to claim 2, wherein the molar ratio of said di-cyclopentenyl-polysulfanes to said sulfur is 1:1 to 1:9.

4. A process according to claim 3, wherein said molar ratio is 1:3 to 1:5.

5. A process according to claim 4, wherein said molar ratio of said di-cyclopentenyl-polysulfanes to said hydrogen sulfide is 2:1 to 1:5.

6. A process according to claim 5, wherein said molar ratio is 1:1 to 1:2.

7. A vulcanizing agent for the production of unsaturated rubber vulcanizates comprising polymeric sulfur compounds of the formula (I)

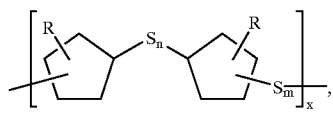

(I)

wherein the substituents
R represent hydrogen and/or methyl,
n and m independently denote integral or non-integral numbers in the range from 2 to 12 and x denotes an integral or non-integral number in the range from 2 to 500.

8. A vulcanizate comprising polymeric sulfur compounds of the formula (I)

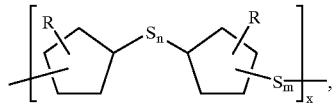
(I)

wherein the substituents

R represent hydrogen and/or methyl, n and m independently denote integral or non-integral numbers in the range from 2 to 12 and x denotes an integral or non-integral number in the range from 2 to 500.

9. A vulcanization product according to claim 8, wherein said product is a shaped rubber article.

10. A vulcanization product according to claim 9, wherein said product is a tire component.

* * * * *